United States Patent [19]

Graulich et al.

[11] Patent Number: 5,912,698
[45] Date of Patent: Jun. 15, 1999

[54] IMAGE RECORDING SYSTEM

[75] Inventors: Markus Guenter Graulich, Stuttgart; Karl Heinrich Manfred Vodegel, Leinfelden-Echterdingen, both of Germany

[73] Assignee: International Business Machines Corporation, Armonk, N.Y.

[21] Appl. No.: 08/708,248

[22] Filed: Sep. 3, 1996

[30] Foreign Application Priority Data

Sep. 5, 1995 [DE] Germany .................. 195 32 842

[51] Int. Cl.⁶ ............................................. H04N 7/18
[52] U.S. Cl. ......................................... 348/91; 382/101
[58] Field of Search ..................... 348/161, 91; 382/101, 382/164, 318

[56] References Cited

U.S. PATENT DOCUMENTS

| | | | |
|---|---|---|---|
| 4,783,825 | 11/1988 | Hirose et al. | 382/101 |
| 5,103,489 | 4/1992 | Miette | 382/101 |
| 5,267,335 | 11/1993 | Mita | 382/318 |
| 5,293,431 | 3/1994 | Hayduchok et al. | 382/101 |
| 5,311,999 | 5/1994 | Malow et al. | 348/91 |
| 5,504,319 | 4/1996 | Li et al. | 382/318 |
| 5,600,732 | 2/1997 | Ott et al. | 382/318 |
| 5,675,671 | 10/1997 | Hayduchok et al. | 382/101 |

*Primary Examiner*—Brian Casler
*Assistant Examiner*—Luanne P. Din

[57] ABSTRACT

An image recording system is described for automatic address location on large letters and parcels, comprising a high resolution grey scale camera and a low resolution color camera. Both cameras are directed at one illumination slit past which the object to be processed is fed. The color camera is operated in a special mode which allows it to manage with only a single illumination slit, where adequate light intensity is provided for both cameras. A method for automatic address recognition on large letters and parcels is also provided, together with a method of segmenting color images in the recognition of address blocks.

10 Claims, 1 Drawing Sheet

IMAGE RECORDING SYSTEM

This application claims the benefit of priority under 35 U.S.C. § 119 to German Application No. 195 32 842.6, filed on Sep. 5, 1995.

FIELD OF THE INVENTION

The present invention relates to an image recording system, particularly an image recording system for automatic address recognition on packets and parcels. The invention further relates to a method for the recognition of address blocks of packets and parcels as well as to a color segmentation matched to the image recording system for improving address block location.

BACKGROUND OF THE INVENTION

While the automatic location and recognition at high speed of the addresses on standard letters has long been practiced (cf. for example, A. K. Jain et al.; Pattern Recognition, Vol. 25, No. 12, p. 1459 ff.; Pergamon Press Ltd., 1992) and is used in almost all post offices, this still causes some difficulty for so-called packets (e.g. DIN A4, B4) and parcels. The reason for this lies in the very large amount of data (large area) which has to be processed in the case of the corresponding objects as well as in the high data transfer speed required for the high throughput. In addition, the rational recognition of the address is made difficult by the frequently very non-uniform position of the address on the object. Rational recognition of the address is made even more difficult in the case of large letters and parcels (such as, for example, journals, catalogues or advertising material) by an often very varied multi-colored background compared with standard letters in which color information plays a rather subordinate role. Until now, therefore, such objects are sorted exclusively by hand. Recently, automatic equipment has come onto the market which recognizes addresses by using a high definition grey scale camera (cf, for example, A. K. Jain et al., "Address block location on envelopes using Gabor filters", Pattern Recognition, Vol. 25, No. 12, pp. 1459–1477, 1992 or S. N. Srihani et al., "Recognising Address Blocks on Mail Pieces", AI Magazine, Winter 1987, pp. 25–40). In this way the image of the object to be read is obtained as a grey scale image, converted to a binary image and finally processed with a so-called "textblock finder", which is capable of locating text components and of combining these into words, lines and finally "text blocks", which are possible "candidates" for address data.

After the correct address block has been determined through a knowledge-based system or a neural network or through statistical classifiers (where, i.a., features such as length or height of the text block, the number of lines and the ratio between black and white pixels are involved), it is finally read by an OCR (optical character recognition) reader (cf., for example, S.N. Sriheri et al., "Towards developing a real time system to locate address blocks on mail pieces", Int. Il. Res. & Engng. Postal Appl., 1(1), pp. 57–65, 1989).

The recording of grey scale or color images is generally effected by passing the object to be read uninterruptedly through a light slit produced by a suitable illuminating device. In this way, the whole surface of the document is recorded by means of a grey scale camera directed at this light slit and subsequently digitized.

In the case of complex colored packets and parcels, however, the address block often cannot be found in this grey scale or binary image, because of the low data density of the address block in comparison with the large amount of other unwanted information on the object.

In order to be able to use OCR in the automatic sorting of packets and parcels it is necessary to digitize the whole surface at at least 200 dpi (dots per inch) (=8 bit grey scale values per pixel), in order to be able to resolve small letters. The resultant quantity of data and the frequently highly colored surface of a large letter or parcel make the search for the address block much more difficult.

An important criterion in evaluating the capacity of a fully automated address recognition system is the throughput (reading speed) and recognition rate. Thus improvements in recognition of just one percent lead to cumulative savings of millions. In order to extend the potential of such a system to its fullest extent, all requisite information must be recorded as soon as the camera has recorded the object and subsequently processed by methods suited to the specific recording system.

For address recognition of packets and parcels which also contain color information it therefore seemed desirable to record and evaluate this color information additionally, where the recording of the color information (at a lower resolution) can serve for the rapid and certain location of the address and the recording of grey value data (at a higher resolution) for the actual reading of the address data.

F. Ade et al., "A two-step procedure to find the destination address block on parcels, Actes des premieres journees europeennes sur les technologies postales", Proceedings, Nantes, France, 14–16 June 1993, Vol. 1, pp. 303–320, describes a two stage process for address block recognition on parcels.

For this, possible "address block candidates" are extracted in a first stage using a low resolution color image (1 pixel/mm) of the whole of one side of the parcel, from which, based on characteristic features, the actual address blocks are identified. In a second step, a high resolution (4 pixels/mm) binary image is then produced, from which the address block is then read by means of OCR.

One disadvantage of this method is the very low reading rate (ca. 5 min per parcel)

It is possible to obtain color and grey scale data at different positions on the object to be processed with two illuminating devices separated from one another. However, for this, additional illuminating devices, the corresponding adjustment, object start and end signals or even object tracking (where the distance between the two exposures is large) are generally required.

The IBM Bulletin "M.A.R.S., IBM Automatic Mail Address Recognition System", March 1995, describes such an automated address recognition system consisting of a low resolution color camera and a high resolution grey scale camera.

A further problem with the simultaneous recording of color and grey scale data resides in the fact that different light intensities are required for the two exposures as a result of the differences in resolution.

In addition, a high reading speed generally requires a high light intensity in order to illuminate adequately the lines on the object which are to be read.

SUMMARY OF THE INVENTION

One object of the present invention is therefore to provide a system for recording images, particularly for address recognition on packets and parcels, which avoids the above-mentioned disadvantages of the state of the art without limitation of the high reading speed for standard letters previously achieved.

This object is achieved by means of the image recording system of Claim 1, the method for address recognition in accordance with Claim 10.

Further advantageous embodiments are shown in the sub-claims.

The image recording system in accordance with the invention consists of a high resolution grey scale camera together with a low resolution color camera, where the latter is operated in such a way that one element of the object is projected to a plurality of elements of one line of the color camera during the illumination and the signal of the plurality of elements of a color line is electronically averaged after illumination.

The low resolution image of the color camera thus serves to determine the position of the address block while the high resolution image of the grey scale camera serves for the reading of the address block found.

By operating the color camera in the specially matched mode it is possible to manage with a common light slit for both cameras, where there is a sufficient light intensity even for the high resolution grey scale camera. It is thus possible to save on additional lighting fittings, adjustment and letter start and end signals and further tracking of the object. Both the color and the grey scale cameras are thus arranged at the same light slit and hence the grey scale and the color data obtained at the same position of the object.

The proposed combination of high resolution grey scale camera and low resolution color camera, particularly in connection with an appropriate color image segmentation, allow a greatly improved recognition rate and speed for address blocks without reducing the throughput, i.e. the reading rate.

BRIEF DESCRIPTION OF THE DRAWINGS

The invention is hereinafter described in more detail, with reference to the attached drawings. These show FIG. 1 a schematic representation of an image recording system in accordance with the invention.

DETAILED DESCRIPTION OF THE PREFERRED EMBODIMENTS

Figure 1:
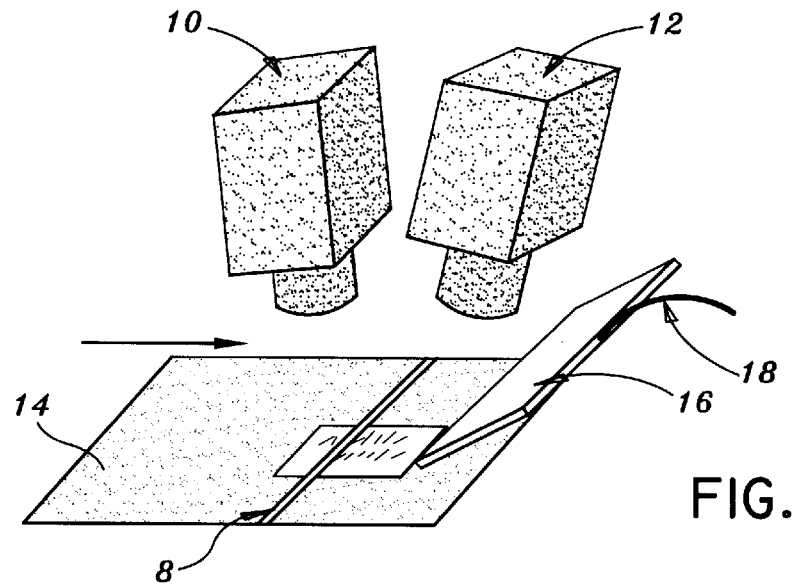

In the cameras shown in FIG. 1, the color camera 10 and the grey scale camera 12, are line cameras, where the currently available color cameras with adequate line frequency have three separated CCD lines (for red, green and blue) with a fixed line width w, which are spatially separated and are spaced apart by a multiple of this line width w (for example 8 w). The invention is not, of course, limited to these cameras. For the sake of simplicity, however, it will be described below in terms of these cameras. As the skilled man can readily recognize, the invention can also be used with other types of camera.

The color camera is operated, in accordance with the invention, in one of the modes described in more detail below, which allows it to work with a common illumination slit, which can also provide sufficient intensity for the grey scale camera. Both cameras are thus mounted on rotating/tilting tables (not shown). A sliding table (also not shown) allows fine adjustment of the image field. The light source is installed in a separate housing (not shown). The light is then supplied to a glass fibre cross-section converter 16 through a glass fibre cable 18, which forms the light into a light slit 8 by means of a lens (not shown). The width of the light slit is thus dependent upon the amount of light. It should be wide enough for variations in the height of the object being examined not to bring about any reduction in the illumination of all three lines of the color camera, if the light is directed at a predetermined angle. Here, a slit width of ca. 3.5 to 8 mm has been shown to be advantageous, a slit width of ca. 4 mm being particularly preferred. It should be noted, that even a direct illumination by means of a cylindrical lens is possible.

The object 14 is fed past the illuminating slit 8 at a speed of up to 3 ms$^{-1}$, preferably >2.5 ms$^{-1}$. The translation rate should be as fast as possible in order to ensure a high throughput. However, if the speed is too great, the result will be that too little light is available, while if the speed is too low, the throughput will be drastically reduced.

Figure 2:
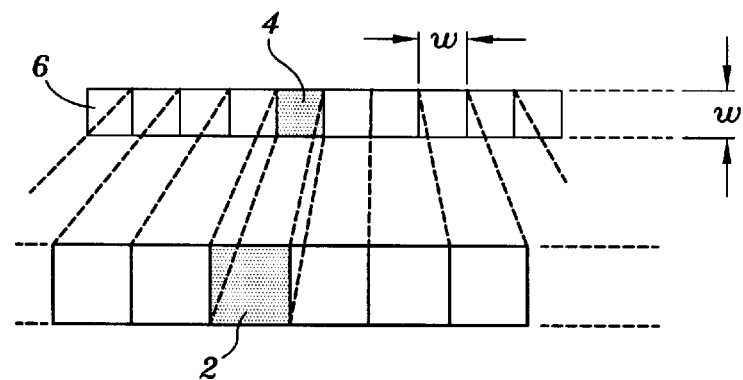
FIG. 2 a normal illustration of an object element on a CCD element of a color cell.

FIG. 2 shows the conventional illustration of an object element 2 on a CCD element 4 of a color line 6, where, as determined by the camera, the line width of the CCD line w=0.014 mm and the line width of the object, as a consequence of the resolution of 40 dpi (24.4/40) selected, amounts to 0.635 mm. The resolution itself is thus limited by the line frequency.

Figure 3:
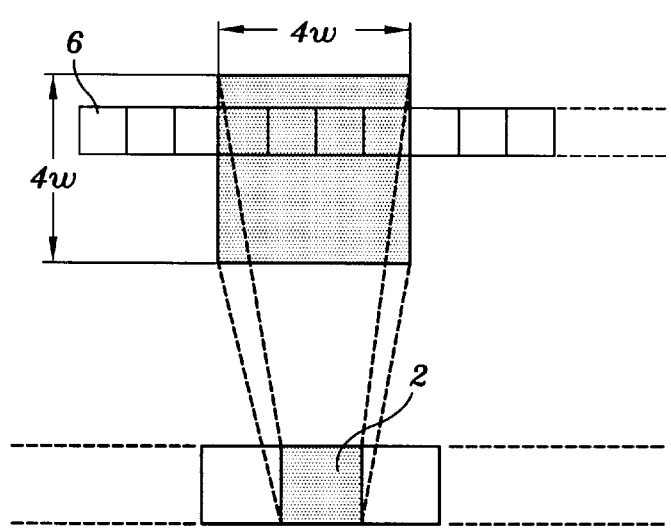
FIG. 3 a similar illustration in the case of the image recognition system in accordance with the invention.

In the present example, for each object element 2 one CCD element 4 is shown on the color line 6. This conventional representation is now replaced by one in which one object element is represented on a plurality n of CCD elements, that is, magnified by a factor of n, where n=4 in the example (FIG. 3). The whole object element image thus covers 16 CCD element areas, but only 4 elements are recorded by the camera at a given time and summarized after exposure. This simple summary of CCD elements is generally known as "binning". It should be noted that the present invention does not require to be limited to this value. The maximal value for the factor w will be determined by the size of the object, the number of CCD elements of the line and their separation in line widths w.

In order that the whole surface of the object should be recorded if possible, the electronic aperture should be open over the whole of the line cycle time, i.e. the quotient between object element size and translation speed, in the selected example for 0.635/2500=2.54×10$^{-4}$ s, i.e. the exposure time and the line cycle time must be equal. In this way the intensities of all "object image strips" will be integrated timewise in the direction of travel. After the exposure of a line of the object, the signal from all n CCD lines will be electronically added or standardized (binning). Thus, in this case there is a combination of "time" and spatial (binning) integration ("time binning").

From the use of this "time/binning mode" the result will first be a higher sensitivity of the color camera through the n*n times larger imaging (in the example 4*4, cf. FIG. 3) of an object element on the CCD line the separation of the camera and object is reduced by a factor of about n. The greater amount of light (by n$^2$) accepted from the object largely balances out the larger (by n$^2$) image area, so that the intensity of illumination on a CCD element therefore remains the same. With n CCD elements per object image, the sensitivity is thus increased by a factor of n.

Because of the n-times magnification compared with "normal operation" only about 1/n th of the object's surface needs to be illuminated. By using the same light source intensity, the intensity of the illumination on the object is thus increased n-fold. The overall gain is therefore increased by a factor of $n^2$ for the exposure of the CCD element.

In addition, the resolution of the color camera increases at the same exposure time, since the resolution function, i.e. the convolution of the object element-image height with the height of the CCD line (height=dimension in the direction of travel), instead of being $2*n$ times, has a width of $1+1/n$, so that the image is consequently sharper.

For the grey scale camera, the gain in respect of intensity of illumination is obtained from the reduction of the illuminated surface with a factor of ca. n.

Thus, in accordance with the invention a joint illumination is achieved for the two cameras and is also adequate.

The following example of an embodiment will serve to explain in detail the image recording system in accordance with the invention.

A resolution of 200 dpi on the grey scale camera corresponds to a line width of 127 µm on the object (letter), which at a selected scanning rate of 2.5 ms$^{-1}$ has to be shown on the grey scale CCD line in an exposure time of less than 50 µs. Consequently, a very high light intensity on a small area is required.

A resolution of 40 dpi on the color camera corresponds to a line width of 635 µm on the object at an exposure time of 250 µs. The three CCD lines with a length of 2096 elements in the camera are at 8 (CCD) line widths from one another and therefore cover an image area of 17 line widths. The smallest area of the object which has to be illuminated therefore has a width of 17*0,635 mm=10.8 mm. If the light of a lamp (even an arc lamp) is spread over this width, the intensity of illumination will no longer be adequate for the grey scale camera.

In order to obtain quadratic pixels, the factor n is limited, with the type of camera selected with an 8 w separation of the CCD lines, to the values 2, 4 and 8, i.e. to integer factors of the line separation. Therefore, if, for example, a width of 260 mm is recorded, 410 pixels will be generated per line. 820 CCD elements are required for n=2, 1640 for n=4 and 3280 for n=8; n=4 is therefore the maximum with 2096 available. The optics are now selected in such a way that one object element (635*635 µm) will be depicted on an image area of 4*4 CCD elements (FIG. 3) instead of on one (FIG. 2). The exposure time at 250 µs is selected to be the same as the line cycle time, so that four CCD elements extend over this area and integrate the intensity. Each four of these elements will then be summarized.

The image area thus increases to 4*4=16-fold, as are the solid angle included by the objective and the quantity of light per unit time. The intensity of illumination on the CCD line thus remains relatively constant. If four CCD lines are summarized, they will supply four time the signal. The illumination is reduced from 17 lines at 0.635 mm=10.8 mm to 5*0.635 mm=3.2 mm in width (gain factor 10.8/3.2=3.4). The overall gain factor in the illumination density of the CCD line thus amounts to 4*3.4=13.6 and, for the grey scale camera, 3.4.

Using a DC arc lamp at 450 W and the use of a glass fibre section converter for the illumination only the factors obtained by way of the above-mentioned time/binning mode of the color camera therefore make a joint illumination possible. Higher capacities cannot be carried through the glass fibers.

For color separation, in addition to the grey scale image, scanned low resolution color images (e.g. 40 dpi=16 bit hue/pixel) are broken down into so-called facets (fields e.g. of 24×24 pixels in size). After conversion of the RGB (Red-Green-Blue) representation of the color image into HSI (hue-saturation-intensity) representation, characteristics based on the H, S and I values were extracted in each facet. These are the means and the variances of the hue H, the saturation S and the intensity I of all pixels within one facet. Further characteristics could be the number of pixels with a significant hue within the facet, i.e. the "non-grey" pixels, as well as the proportion of the colors red, blue and black. Using these characteristics, a first classifier first determines for the whole object, i.e. all facets, whether it is a single color object or multicolored. For this, the HSI values are analyzed by known methods. If there is a large proportion of pixels with the same shade of color at the same intensity and color saturation, i.e. these pixels have (within a predetermined range) the same HSI value, this means that the major part of the surface of the object has this color, that is, the object is of a single color. In this case, a single HSI value is present with a high frequency (with low scatter). On the other hand, with a multicolored object there are several limit points in the HSI region. The classifier therefore decides whether there is one or several or no significant limit points and thereby determines, based on statistical data for a number of objects, whether the present object is single-colored or multicolored. It thus decides whether the frequency found is "frequent enough".

A second classifier then uses this additional information in order to determine, for each facet, the likelihood that it is part of an address block. If this likelihood is high, that is, if a predetermined threshold value is exceeded, the color of the background is determined. This threshold value is determined on the basis of the statistical values of a number of objects which had previously been analyzed. It is therefore necessary to determine how frequently a given combination of characteristics of the facets occurs, both in the "address block part" and in the "non-address block part". For the actual facets the magnitude of the shortest distance from the nearest combination in the two classes is then determined. In combination with the probability, that is, the frequency of its occurrence, a value can finally be determined which must lie above or below a threshold value.

Adjacent facets with high "probability of address block" (that is, lying above the threshold value) and the same color are then joined to an "address block candidate". Geometrical measurements of such a candidate (for example, position on the object, side to length ratio, overall size, etc.) form a further basis for calculation.

By means of this color segmentation it is possible, in very many cases, to limit the enormous quantity of data, in which the address block has to be sought, to a few facet images. In this way the address block can be found more easily. Together with the address block information from the color image, the OCR can then be employed more efficiently in the high resolution grey scale image.

We claim:

1. A system for recording the image of an object, the image composed of at least one object element, the system comprising:

means for projecting an illumination slit on the object;

a high resolution grey scale camera, said grey scale camera being directed to said illumination slit on the object and providing a high resolution image signal;

a low resolution color camera having at least one color line including a plurality of imaging elements, said color camera being directed to said illumination slit on the object substantially simultaneously with said grey scale camera, said color camera being operated such that each object element is received by at least two of said imaging elements, said at least two imaging elements providing an image element signal;

means for averaging and integrating said image element signal; and means for translating the object with respect to said illumination slit.

2. Image recording system in accordance with claim 1, characterized in that the resolution of the grey scale camera is at least 200 dpi.

3. Image recording system in accordance with claim 2, characterized in that the resolution of the color camera is at least 40 dpi.

4. Image recording system in accordance with claim 3, characterized in that the width of the illumination slit is 3.2 to 8 mm, preferably 4 mm.

5. Image recording system in accordance with claim 4, characterized in that the color camera comprises three separate CCD lines.

6. Image recording system in accordance with claim 5, characterised in that the three CCD lines each have a line width w and are separated from each other by a factor of 8.

7. Image recording system in accordance with claim 6, characterised in that speed of translation of the object is at least 2.5 m per second.

8. Image recording system in accordance with claim 7, characterised in that one element of the object is represented on an area of 4×4 CCD elements.

9. Image recording system in accordance with claim 8, characterised in that the quotient of the size of the object element and the speed of translation (line cycle time) and the exposure time are of equal magnitude.

10. A method for automatic image recording of an object comprising the steps of:

a) projecting an illumination slit onto the object;

b) simultaneously directing a grey scale camera and a color camera to the illumination slit;

c) continuously feeding the object relative to said illumination slit and generating line feed signals;

d) exposing a CCD line of the color camera between said line feed signals and generating a CCD line signal;

e) storing the CCD line signal into an electronic memory with each line feed signal;

f) repeating steps c) to e) until the complete object is processed; and g evaluating the memory contents by means of OCR.

* * * * *